June 14, 1949.                E. FURER ET AL                2,472,944
                    GYROSCOPICALLY STABILIZED CAMERA BOOM
Filed March 31, 1947                                3 Sheets-Sheet 1

EDWARD FURER,
CHARLES B. LONON,
INVENTORS.

BY
ATTORNEY.

June 14, 1949.  E. FURER ET AL  2,472,944
GYROSCOPICALLY STABILIZED CAMERA BOOM
Filed March 31, 1947  3 Sheets-Sheet 2

EDWARD FURER,
CHARLES B. LONON,
INVENTORS.

BY
ATTORNEY.

EDWARD FURER,
CHARLES B. LONON,
INVENTORS.

Patented June 14, 1949

2,472,944

UNITED STATES PATENT OFFICE 2,472,944

GYROSCOPICALLY STABILIZED CAMERA BOOM

Edward Furer and Charles Brandon Lonon, Burbank, Calif.; said Lonon assignor to said Furer Application March 31, 1947, Serial No. 738,464

2 Claims. (Cl. 60—97)

Our invention relates to the field of automatically positioned devices, and more particularly to a mobile, gyroscopically stabilized, camera boom that may be used in supporting a cinematographic camera in a predetermined plane regardless of the position occupied by the supporting vehicle.

In the motion picture industry, it is frequently necessary for the proper continuity of the story being photographed, to impart to the audience viewing the completed picture the impression that they are moving with, away from, or toward a particular scene of action. It will be readily apparent that the obvious method to use in attaining this result would be to move the camera in the same direction, and at the same speed, as would an individual were he viewing the scene under similar circumstances. Although the above method can be used in creating a cinematographic illusion of movement, certain physical difficulties are encountered in photographing such a scene. Chief amongst these difficulties, and arising from the fact that the heavy and somewhat bulky motion picture camera must necessarily be supported upon a vehicle during its course of movement, is the tendency of the camera to rock in a vertical plane as the supporting vehicle travels over a surface of uneven character. Therefore, as the finished film is used for reproducing a motion picture that will give an impression of movement, not only will the desired effect of horizontal movement be presented to the viewing audience, but the undesired vertical rocking motion which may prove most annoying unless completely eliminated. As the rocking motion of the camera originates from the uneven vertical motion of the camera supporting vehicle, it has been common practice in the motion picture industry to move the camera on special roads and runways that are substantially horizontal. Although such roads and runways largely eliminate any rocking motion of the camera, this solution has not proven satisfactory in that it is both costly and time consuming.

The primary object of our invention is to furnish a mobile, gyroscopically stabilized, camera boom that not only may be moved from place to place, but will maintain a camera supported thereon in a predetermined plane irrespective of the position occupied by the supporting vehicle.

Another object of our invention is to supply a camera boom that is hydraulically operated, and functions in such a quiet manner as to be particularly adapted for use in the filming of action scenes in which sound effects are recorded.

A further object of our invention is to provide a camera boom which will eliminate the necessity of building special roads and runways for its use, together with the inherent expense and delay associated with such undertakings.

These and other objects and advantages of our invention will appear from the following description of a preferred form thereof, and from the accompanying drawings wherein.

Figure 1:
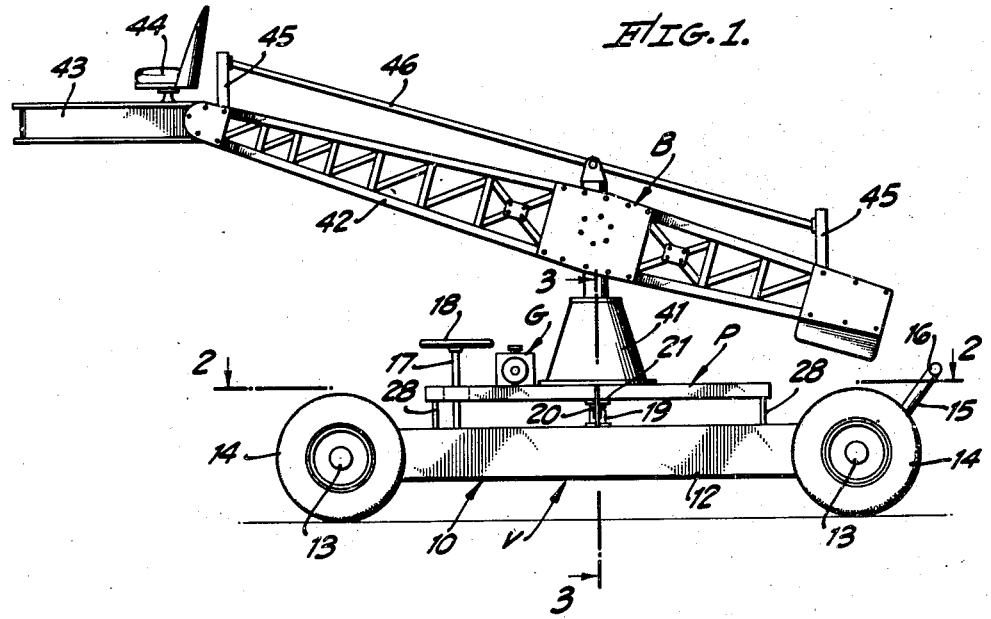
Figure 1 is a longitudinal elevational view of our mobile, gyroscopically stabilized, camera boom.
Figure 2:
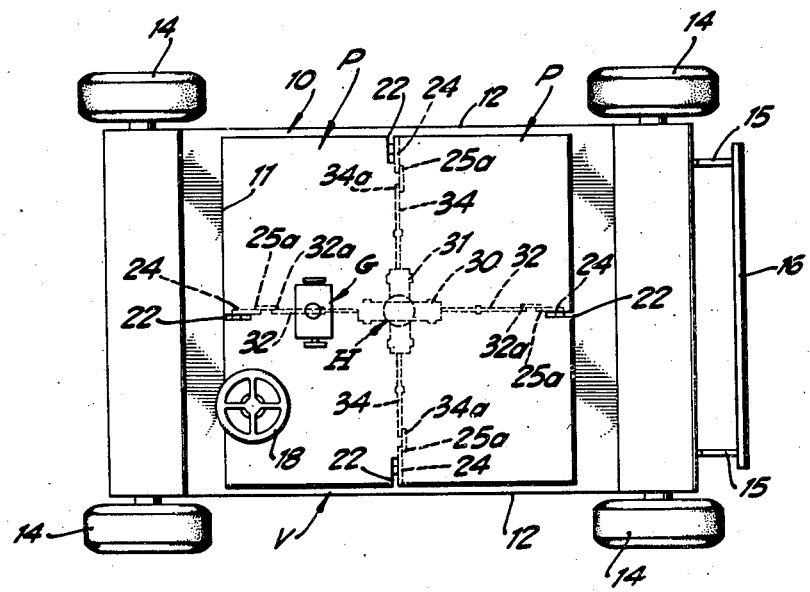
Figure 2 is a plan view of the camera boom supporting vehicle, and a portion of the hydraulic mechanism used in actuating the camera boom, taken on the line 2—2 in Figure 1.

Referring now to the drawings and particularly to Figure 1 thereof for the general arrangement of our invention it will be seen that movably mounted upon a four-wheeled vehicle V is a platform P, that serves to rotatably support a camera boom B. For controlling both the position of the platform P and the camera boom B, we have provided a vertically sensitive gyroscope G which for convenience in the maintenance of same, is preferably located on the upper face of the platform as best seen in Figures 1 and 2. Electrically controlled by the position of the gyroscope G is a hydraulic mechanism H that is used in maintaining the platform P and camera boom B in a predetermined plane, and which is fully shown in diagrammatic form in Figure 5.

In the construction of the vehicle V, we have found it desirable to provide a rectangular frame 10 that is fabricated from a pair of laterally spaced end pieces 11, which are rigidly held in position between a pair of parallel side members 12 by being welded, bolted, or otherwise secured thereto. Rotatably mounted on an outwardly extending horizontal axle 13 disposed at each end of the side members 12, is a pneumatic tired wheel 14 used in movably supporting the frame 10. Extending upwardly from the rear of the vehicle V, and at an angle thereto are a pair of laterally spaced arms 15, which support a handle 16 that may be used for manually pushing the vehicle V. Located near the forward end of the vehicle V, and for convenience of operation to one side of the camera boom B when it is situated in a longitudinal position, is an upwardly extending steering column 17 which carries a suitable steering wheel 18 positioned on its upper extremity for guiding the vehicle V. For suspending the forward axles 13 from the frame 10, as well as allowing them to be rotated in a horizontal plane in order that the vehicle V may be guided by the steering wheel 18, we have employed conventional mechanism now in common use and available for such purposes.

Disposed at substantially mid point on the side members 12, and extending therebetween in a position parallel with the end pieces 11, is a relatively heavy, inverted, channel-shaped member 19. Centrally positioned on the member 19 is a vertically disposed universal joint 20, with a horizontal pressure plate 21 situated on its upwardly extending end. Rigidly attached to the upper face of the pressure plate 21 by conventional means is the platform P, which is thus movably supported in a substantially horizontal plane upon the vehicle V.

Figure 3:
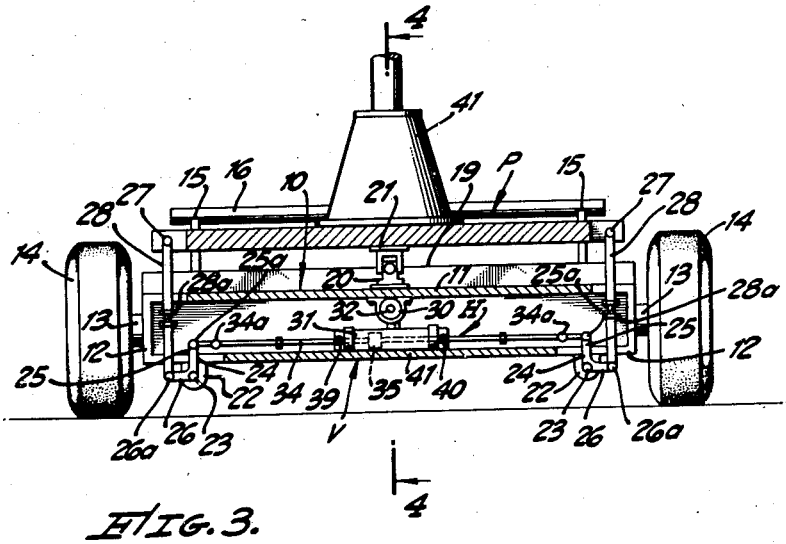
Figure 3 is a vertical section of the camera boom supporting vehicle and hydraulic mechanism taken on line 3—3 of Figure 1.
Figure 4:
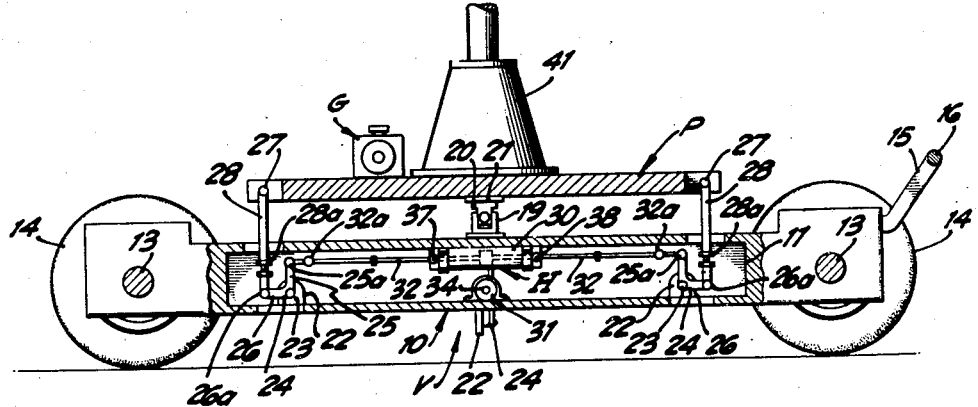
Figure 4 is a longitudinal vertical section of the camera boom supporting vehicle and hydraulic mechanism taken on the line 4—4 of Figure 3.

Directly opposite the universal joint 20, and rigidly supported on each of the end pieces 11 in an upwardly extending position, and on each of the side members 12 in a downwardly extending position, is a journal box 22 as best seen in Figures 3 and 4. Rotatably mounted in each of the journal boxes 22 is a horizontal shaft 23 with an L-shaped bell crank 24 affixed to its inwardly extending end. Each of the bell cranks 24 is composed of a substantially vertical and horizontal arm 25 and 26 respectively. Attached to the platform P by a pivoted connection 27, and extending downwardly to the outer extremity of the horizontal bell crank arm 26 where a second pivoted connection 26a is provided, is a vertically disposed connecting rod 28. A threaded adjustment device 28a of conventional design is provided on each of the connecting rods 28, and allows same to be lengthened or contracted to bring the platform P into the desired plane, the importance of which will hereinafter be explained.

Situated directly under the universal joint 20, one above the other, and with their longitudinal axes normal, are a pair of hydraulic cylinders 30 and 31 respectively. Extending outwardly from each end of the upper cylinder 30 is a slidably mounted piston rod 32 with its inner end connected to a piston 33. Connected to the outwardly extending end of each of the piston rods 32, at a pivoted joint 25a, is one end of the vertical bell crank arm 25 as best seen in Figure 4. A pair of piston rods 34 extend from each end of a piston 35 in hydraulic cylinder 31, and are likewise connected to pivoted joints 25a on the vertical bell crank arms 25, as best seen in Figure 3. Pivoted connections 32a and 34a disposed near the outer end of each of the piston rods 32 and 34 respectively permit a vertical displacement of the bell crank arms 25 without disturbing the horizontal alignment of the inner portions of the piston rods in the cylinders 30 and 31.

A pair of hydraulic connections 37, 38 each situated near one end of the cylinder 30, and a pair of similarly disposed connections 39, 40 on cylinder 31, allow the cylinder contained pistons 33 and 35 to be moved by the introduction of hydraulic fluid under pressure. Therefore, as fluid enters the cylinders 30 and 31 the piston rods 32 and 34 are moved horizontally, and the bell cranks 24 being movably connected thereto are partially rotated. The function of each of the bell cranks 24 is to translate horizontal motion of the vertical arm 25 into vertical motion of the horizontal arm 26; hence as the piston rods 32 and 34 are moved by the pistons 33 and 35 respectively, the connecting rods 28 are vertically displaced and the position of the platform P altered. Thus, by the introduction of hydraulic fluid under pressure into the cylinders 30 and 31, the position of the platform may be controlled.

Rigidly affixed to the upper face of the platform P is a vertical support 41 upon which is rotatably mounted a counterweighted camera boom 42. The free end of the camera boom 42 carries a substantially horizontal mounting 43 adapted for receiving and supporting a cinematographic camera, and a seat 44 for the use of the cameraman located adjacent thereto. For rotating the camera boom 42 in a horizontal plane, a pair of laterally spaced upright members 45 are disposed along the top of the boom with a handle 46 extending therebetween. It will be apparent that should it be desired, both the rotation of the camera boom 42, and the horizontal movement of the vehicle V may be accomplished mechanically rather than manually.

For supplying a source of hydraulic fluid 47 to actuate the pistons 33 and 35 we provide a hydraulic pump 48 which is driven by an electric motor 49 through a coupling 50. In order that the platform P may remain clear for the use of technicians during the filming of a picture, we have found it desirable not only to locate the hydraulic pump 48 on the frame 10, but also the balance of the hydraulic mechanism H. However, as the arrangement of a number of component parts of the hydraulic mechanism H may be varied to suit the convenience of the user of our device, and without affecting the operation of same, the conventional members used in supporting the parts from the frame 10 will not be enumerated in the present application.

Connected to the discharge of the pump 48, by a conduit 51, is a relief valve 52, which is adapted to discharge hydraulic fluid 47 from an orifice 53, when the hydraulic pressure developed by the pump 48 rises above the maximum hydraulic pressure used in actuating the hydraulic mechanism H. Conveniently located near the pump 48 and connected to the suction thereof by a conduit 54 is a reservoir 55 that serves not only to store hydraulic fluid 47 from the pump 48 but to receive through a conduit 56 such excess fluid as may be discharged by the relief valve 52 through the orifice 53. Thus it will be seen that when the pump 48 continues to operate after the hydraulic mechanism H no longer requires fluid, and an excessive hydraulic pressure is being built up, that this pressure is relieved by the action of the relief valve 52 in permitting the escape of excess fluid to the reservoir 55. Upon the hydraulic mechanism H again requiring hydraulic fluid 47, and the hydraulic pressure relieved by the flow of fluid 47 into the cylinders 30 and 31, the orifice 53 will be closed by the action of the relief valve 52 until such future time as an excessive hydraulic pressure again develops.

In fluid communication with the relief valve 52, through a conduit 57, is a check valve 58, which serves to prevent hydraulic pressure built up by the pump 48 from being dissipated by backward flow of the fluid 47 through the pump to the reservoir 55 when the pump stops operating. An electrical pressure switch 59, that operates in an adjustable range wherein the electrical circuit to the motor 49 is broken when the hydraulic pressure built up by the pump 48 reaches a certain predetermined maximum value and is reestablished when the hydraulic pressure drops to a certain minimum point, is hydraulically connected to the check valve 58 by a conduit 60.

For storing hydraulic fluid 47 under pressure four spherical accumulators 61 are provided, and placed in fluid communication with the pressure switch 59 by a conduit 62. In the operation of the accumulators 61 the fluid 47 is forced therein by the action of the pump 48, and the air contained in each of the accumulators is compressed into an elastic cushion that tends to expand and force the fluid therefrom. It will be obvious that both the number and the shape of the accumulators 61 may be varied to suit the particular adaptation of my invention, as long as ample fluid capacity is provided for operating the hydraulic mechanism H under the most adverse conditions which will be encountered. In the construction of our invention we have found it desirable to use four relatively small accumulators 61, for they may be easily located on the frame 10 without interfering with the balance of the hydraulic mechanism H supported thereon. Thus, by the use of the check valve 58 and the accumulators 61, the necessary hydraulic energy required to actuate our invention during the filming of an action scene may be previously built up and stored, and our device used during this period without the pump 48 operating.

Figure 5:
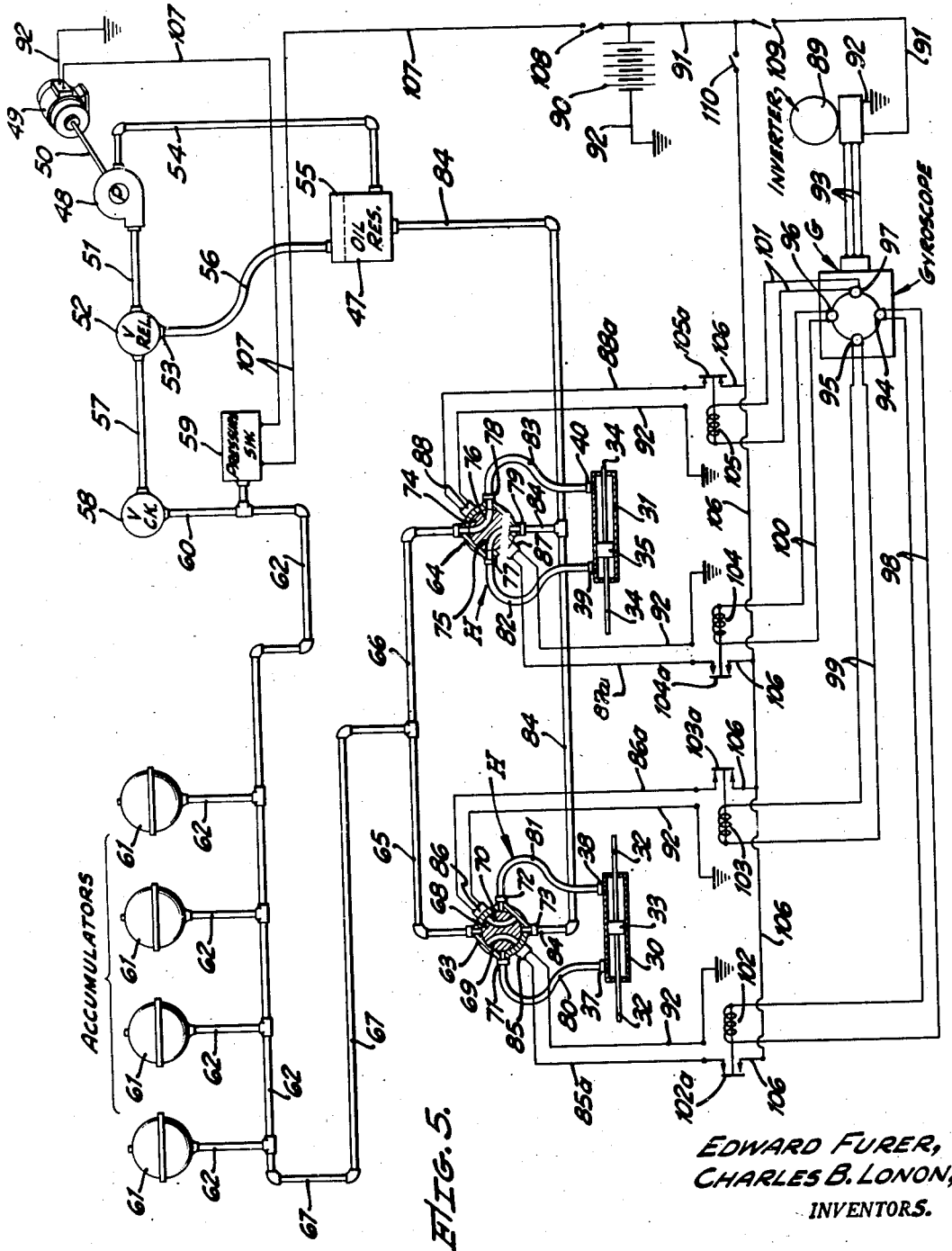
Figure 5 is a diagrammatic view of the hydraulic and electrical equipment used in maintaining the camera boom and its supporting platform in a predetermined plane.

To control the flow of hydraulic fluid 47 to the cylinders 30 and 31, a pair of solenoid-operated, four way valves 63 and 64 are provided. The four way valves 63 and 64 remain normally in the closed position, but each valve upon electrical energization of one of the solenoids provided thereon assumes one of its two possible open positions. Each of the four way valves 63 and 64 is hydraulically connected by a conduit 65 and 66 respectively to a common conduit 67 leading from the accumulators 61. Determining the course of the fluid 47 upon entering the valve 63, is a rotatably contained core 68, which is formed with a pair of bores 69 and 70 therein. Each of the bores 69 and 70 serve as a channel to guide the flow of fluid 47 either to or from a number of valve ports 71, 72 and 73 as best seen in Figure 5. Similarly disposed in four way valve 64 is a rotatable core 74, with bores 75 and 76 provided therein. Each of the bores 75 and 76 is adapted for conducting hydraulic fluid 47 either to or from a number of valve ports 77, 78 and 79 as may also be seen in Figure 5.

Furnishing fluid communication between the hydraulic cylinder 30 and the four way valve 63 are a pair of conduits 80 and 81, with conduit 80 leading from the cylinder connection 37 to the valve port 71, and conduit 81 serving a similar function between cylinder connection 38 and valve 72. A second pair of conduits 82 and 83 serve to place the cylinder 31 and the four way valve 64 in fluid communication. Conduit 82 connects valve port 77 with cylinder connection 39, and conduit 83 likewise places valve port 80 and the cylinder connection 40 in fluid communication. To permit discharge of fluid 47 from the four way valves 63 and 64 after the fluid has been used in actuating the pistons 30 and 31, a conduit 84 is provided, and extends from each of the four way valve ports 73 and 79 to the reservoir 55.

With the component parts of the hydraulic mechanism H assembled in the above relationship it will be seen from an examination of Figure 5 that as the hydraulic pump 48 is operated, fluid 47 will be forced through the conduits 51, 57, 60 and 62 into the accumulators 61. Due to the expansive force of the air cushion existing in the accumulators 61, and the check valve 58 preventing any backward flow of the fluid 47 to the reservoir 55, the fluid is forced through the conduit 67 to the junction with conduits 65 and 66; a portion of the fluid continues to flow through conduit 65 to the four way valve 63, while the balance of the fluid is conducted by the conduit 66 to four way valve 64.

As the valve 63 is illustrated in Figure 5 in the closed position, we will describe the path of the hydraulic fluid 47 through the four way valve 64, which is also typical of the operation of the valve 63. Upon entering the four way valve 64, the fluid 47 flows through the bore 76 to emerge from the valve port 78, and is then conducted into the right hand side of cylinder 31 by the conduit 83. The fluid 47 upon entering the cylinder 31, moves the piston 35 and the piston rods 34 attached thereto to the left, with the result that a pair of oppositely disposed bell cranks 24 are partially rotated. As the bell cranks 24 are rotated, the connecting rods 28 attached thereto are vertically displaced, and the position of the platform P together with the camera boom B rotatably supported thereon is altered. In addition, as fluid 47 enters the right hand side of the cylinder 31, a like amount of fluid is displaced from the left hand side thereof, and flows upwardly in the conduit 82. The fluid 47 flows from the conduit 82 into the valve 64, and is conducted by the bore 75 to the conduit 84, through which it passes to the reservoir 55. It will be apparent that the above description is also typical of the method used in moving the piston 35 to the right, as well as similar operations in which the four way valve 63 and the cylinder 30 are utilized.

For electrically controlling the position of the four way valves 63 and 64, a pair of solenoids 85 and 86 are provided on valve 63, and a similar pair of solenoids 87 and 88 on valve 64. By the electrical energization of one of the solenoids situated thereon, the four way valves 63 and 64 may be rotated from their normally closed, to one of the two possible open positions.

To detect any variation of the boom supporting platform P from its predetermined plane, as well as causing an electrical circuit to be completed to actuate the solenoid-operated valves 63 and 64 to correct such a variation, the gyroscope G is employed, and is preferably located on the upper face of the platform P in an accessible position. As a number of commercially available gyroscopes operate upon an alternating current of unusual voltage, an inverter 89 is provided to furnish the necessary electrical power to actuate same. Direct electrical current for operating the inverter 89 is supplied from a battery 90, by an electrical circuit which includes a conductor 91, and a ground connection 92 that is made at both the inverter and battery as best seen in Figure 5. Three conductors 93 extending from the inverter 89 to the gyroscope G serve to transmit the necessary alternating electrical power required not only for operating the gyroscope, but for actuating four later to be described relays which are used in controlling the positions of the solenoid-operated four way valves 63 and 64.

The gyroscope G is of the vertical spin axis type, such as the Sperry A-12, and is supplied with a protective housing which serves to enclose an electrically driven rotor that is suitably supported upon a pair of gimbal rings. Also disposed inside the housing, and made an integral part of the gyroscope G, are electrical pickoffs 94, 95, 96 and 97 used in detecting the pitch or roll of the gyroscope. Although the pickoffs 94, 95, 96 and 97 may take various forms, the primary function of each pickoff is to complete an electrical circuit that will serve as a signal to show that the gyroscope has been displaced from its normal operating position in a particular direction. Therefore, for the sake of clarity, we have shown the four pickoffs 94, 95, 96 and 97 spaced at an angle of ninety degrees from one another on the gyroscope G in Figure 5, to indicate that when the gyroscope G is displaced in one of these directions an electrical circuit will be completed. It will be apparent that when the gyroscope G is displaced in a direction intermediate between two of the pickoffs, which is a normal situation, both pickoffs will complete an electrical circuit.

Each of the electrical pickoffs 94, 95, 96 and 97, when the gyroscope G is displaced in its direction, completes an electrical circuit between the inverter 89 and one of a group of electrical relays 102, 103, 104 or 105 through a pair of conductors 98, 99, 100 or 101 respectively. It will be noted in Figure 5 that each of the relays 102, 103, 104 and 105 is electrically connected to the battery 90 by a conductor 106, and to each of the solenoids 85, 86, 87 and 88 by a conductor 85a, 86a, 87a, and 88a respectively. Provided on each of the relays 102, 103, 104 and 105 is a movable contact member 102a, 103a, 104a and 105a respectively. By energizing its corresponding relay, each of the contact members 102a, 103a, 104a or 105a may be caused to move and complete an electrical connection between conductor 106, and conductors 85a, 86a, 87a or 88a respectively. As the free terminal of each of the solenoids 85, 86, 87 and 88 is electrically grounded by a conductor 92, as is one terminal of the battery 90, by the movement of the contact members 102a, 103a, 104a and 105a either or both of the four way valves 63, 64 may be placed in the desired open position by causing the appropriate solenoid situated thereon to be electrically energized by the battery 90.

In the actual operation of our invention the four way valves 63 and 64 are automatically controlled by the position of the gyroscope G, for as it is displaced from its normal operating position an electrical contact is made at one or more of the pickoffs 94, 95, 96 or 97, and certain of the above described relays are actuated by electrical power from the inverter 89. As the actuation of the relays occurs, an electrical circuit is completed between the battery 90 and the necessary solenoids required to place the four way valves 63 and 64 in an open position, whereby hydraulic fluid 47 may flow from the accumulators 61 to move the cylinder contained pistons 33 and 35 into a position in which the camera boom supporting platform P and the gyroscope G are returned to their predetermined plane.

Completing the electrical circuits necessary to automatically operate our invention due to the position of the gyroscope G, is a conductor 107 that extends from the battery 90 to the pressure switch 59, and from there to the motor 49, which like the battery 90 is electrically grounded by a conductor 92.

To allow our invention to be used in the filming of scenes in which sound effects are being recorded, and where the extraneous noise from the operation of the pump 48 would be highly objectionable, a manually operated switch 108 is inserted in the conductor 107 as best seen in Figure 5. By placing the switch 108 in the open position the possibility of the motor 49 being started by the action of the pressure switch 59 when the hydraulic pressure in the accumulators 61 drops below a certain minimum point is eliminated.

A second manually operated switch 109, that is located in the conductor 91 beyond its junction with the conductor 106, permits the gyroscope G and the relays 102, 103, 104 and 105 to be controlled by starting or stopping the inverter 89 used in supplying the alternating current required for their operation. Although upon the closing of the switch 109, the gyroscope G and the relays 102, 103, 104 and 105 are placed in an operating condition, this condition has no effect upon the position of the platform P until a third switch 110 located in the conductor 106 is also placed in the closed position. During the time that the switch 110 remains in the open position, the solenoids 85, 86, 87 and 88 are without electrical power from the battery 90, and are unable to rotate either of the four way valves 63 and 64 from their normally closed position in order that hydraulic fluid may be admitted to cylinders 30 or 31. It will be seen that the use of the switch 110 is quite important, for were it to be placed in the closed position during the time that the gyroscope G is being started up and positioned into its normal operating plane, electrical circuits would be completed at the pickoffs 94, 95, 96 or 97 that would result in violent fluctuations of the platform P and the camera boom B supported thereon.

To place our invention in operation for the first time the vehicle V is moved to a substantially horizontal location and the gyroscope G placed in a vertical position by leveling its supporting platform P into a horizontal plane with the connecting rod adjustment devices 28a. For placing the gyroscope G in a vertical position without adjusting the platform P, manual controls on the instrument are employed. The switches 108 and 109 are now closed to complete the electrical circuits between the battery 90, the pressure switch 59, the motor 49, and the inverter 89. Hydraulic fluid 47 is discharged from the pump 48 to the accumulators 61, wherein it will continue to be forced until the maximum operating hydraulic pressure is reached, and the pressure switch 59 breaks the electrical circuit between the battery 90 and the motor 49. The relief valve 52 is set to discharge fluid 47 from the orifice 53 at a pressure a few pounds above the maximum operating hydraulic pressure, so that if the pressure switch 59 fails to function, any excess fluid discharged by the pump 48 will be returned to the reservoir 55 through the conduit 56. The inverter 89 is now being operated by the battery 90 to supply the necessary alternating current to actuate the relays 102, 103, 104 and 105, together with the gyroscope G.

As a check on whether the platform P is in an exactly horizontal plane the switch 110 that completes the electrical circuit between the battery 90 and the solenoid-operated four way valves 63 and 64 is placed in the closed position. Thus, if the platform P is not in an exactly horizontal plane, an electrical circuit will be completed at one or more of the pickoffs 94, 95, 96 or 97, and the hydraulic mechanism H placed in operation to correct the position of the platform P until it is normal to the axis of rotation of the gyroscope G. Therefore, if there is any movement of the piston rods 32 or 34 upon the closing of the switch 110 the platform P is not in a true horizontal plane, and further adjustment of same can be made before placing the apparatus in operation. The above described leveling operation need be performed only the first time our invention is used, providing the hydraulic mechanism H is operated at all times during the movement of the vehicle V. In this manner the camera boom supporting platform P and the gyroscope G are always in a predetermined plane, and will not be thrown out of adjustment by violent movement of the hydraulic mechanism H when the switch 110 is closed.

With our invention ready to operate, a camera is placed upon the support 43 and secured thereto, where it will be held in a predetermined plane regardless of the position occupied by the supporting vehicle V.

In order to show in detail how our invention operates, we will assume a simple situation in which the left front wheel of the vehicle V, as best seen in Figure 2, sinks into a depression on the surface of the ground over which the vehicle is traveling. It will be apparent that on the ordinary vehicle, with the camera boom in a longitudinal position, such a situation would result in a partial rotation of the camera to the left. In our invention the gyroscope G upon beginning to be displaced from its normal operating position, establishes an electrical circuit at the pickoff 97 between the inverter 89 and the electrical relay 105. With the electrical energization of the relay 105, the contact member 105a movably mounted thereon is caused to make an electrical circuit between the battery 90 and the solenoid 88 through conductors 106 and 88a. The solenoid 88 upon becoming electrically energized rotates the core 74 in the four way valve 64 from its normally closed into one of its two possible open positions, as best seen in Figure 5.

It will be noted that as the expansive air cushion in the accumulators 61 forces the hydraulic fluid 47 through the conduits 67 and 66 into the four way valve 64, that the fluid is diverted by the core 76 into the conduit 83, through which it flows into the right hand side of the cylinder 31. The fluid 47 upon entering the right hand side of the cylinder 31 moves the piston 35 contained therein to the left, with the result that the same amount of fluid 47 is displaced from the left hand side of the cylinder as enters on the right. As the fluid 47 is displaced from the left hand side of the cylinder 31, it flows upwardly in the conduit 82 into the four way valve 64, where it is conducted by the bore 75 into the conduit 84, through which it is returned to the reservoir 55.

As the function of the bell cranks 24 is to translate horizontal motion of the piston rods 32 and 34 into a like amount of vertical motion in the connecting rods 28, it will be seen that by the motion of the pistons 33 and 35 the position of the platform P may be regulated. Thus in the present example, as the piston 35 and the piston rods 34 are moved to the left in unison under the action of the fluid 47, two of the oppositely disposed bell cranks 24 are partially rotated to vertically move the connecting rods 28 attached thereto, and with the result that the camera boom supporting platform P and the gyroscope G are returned to their predetermined plane. Upon the return of the platform P and the gyroscope G to their initial plane, the electrical contact at the pickoff 97 is broken and the relay 105 deenergized, with the result that the electrical circuit between the battery 90 and the solenoid 88 is interrupted. The four way valve 64 immediately assumes its normally closed position, and further movement of the platform P with reference to the frame 10 is made impossible by the piston 35 being firmly held in a stationary position in the cylinder 31 by a cushion of fluid 47 on each side thereof. Of course, the immovable condition of the platform P will prevail only so long as it is maintained in its initial plane by the supporting vehicle V. Upon the platform P being displaced from its initial plane due to the movement of the vehicle V, one or more of the pickoffs will energize the relays necessary to actuate the solenoid-operated four way valve or valves required to correct this condition.

Although a simple situation was assumed to illustrate the workings of our invention, it will be apparent that the same principle applies whether one or all of the wheels 14 are displaced from the horizontal plane. In the actual use of our invention, both of the pistons 33 and 35 will be operating concurrently to hold the platform P in its initial plane, due to the complexity of the surface over which the vehicle V will normally be traveling.

Although in the preferred form of our invention we have shown the platform P held in a predetermined plane by the action of a hydraulically actuated linkage system, the same results may be attained without the use of this linkage system. In this modification of our invention, the platform P continues to be movably supported from the vehicle V upon a vertically disposed universal joint 20, but the hydraulic cylinders are increased to four in number, and are arranged in a vertical position in the location now occupied by the bell cranks 24. Slidably mounted in each of the hydraulic cylinders is a piston that is movably connected to the platform P. Rigidly affixed to the platform P is the vertically sensitive gyroscope G that operates in the same manner as described in connection with the preferred form of our invention, and causes hydraulic fluid to be admitted to the vertically disposed hydraulic cylinders in order that the pistons contained therein may be moved to correct the position of the platform P back to its predetermined plane. While the preferred form of our invention has given very satisfactory results, it may be found desirable in some situations to use the modified form.

In constructing the preferred form of our invention we have used four way solenoid-operated valves of the fully open or closed type; however, this may be varied according to the particular adaptation to which our device will be put, and if found desirable, modulating type four way valves may be substituted. In such a modification of our invention, potentiometric means or their equivalent will be required on the gyroscopic pickoffs, to vary the amount of electrical current flowing therefrom in proportion to the deviation of the gyroscope G from its normal operating position. This varying electrical current flowing to appropriately designed relays will cause a proportional electrical current to flow to the modulating type valves from the battery, and result in the amount of flow of hydraulic fluid to the actuating pistons being proportional to the deviation of the gyroscope G from its normal operating position. Thus, the greater the deviation of the platform P and the gyroscope G supported thereon, the greater will be the rate of flow of fluid to the hydraulic cylinders to rectify this condition, and bring the platform and gyroscope back to their initial plane.

While the apparatus herein shown and described is fully capable of attaining the objects and providing the advantages hereinbefore mentioned, it is to be understood that it is merely illustrative of the presently preferred form of our invention, and that we do not mean to limit ourselves to the details of construction or design herein shown, other than as defined in the appended claims.

We claim.

1. An automatically positioned camera boom which includes: a vehicle; a camera boom movably supported on said vehicle; a hydraulic pump; an electric motor for operating said hydraulic pump; a source of electrical energy; an electrical connection between said source of electricity and said motor; a plurality of multi-port solenoid-operated valves in fluid communication with the discharge of said pump; a plurality of hydraulic cylinders in fluid communication with said valves; a piston slidably mounted in each of said cylinders; a piston rod movably connecting each of said pistons with said camera boom; a gyroscope adapted to electrically signal any deviation of said camera boom from a predetermined plane; electrical means adapted to be actuated by said signals from said gyroscope and complete an electrical circuit between said valves and said source of electrical energy whereby said valves may be actuated to admit hydraulic fluid into said hydraulic cylinders to move said pistons and return said camera boom to its predetermined plane.

2. An automatically positioned camera support which includes: a vehicle; a platform movably mounted on said vehicle; a camera boom rotatably mounted on said platform; an hydraulic pump; an electric motor for operating said pump; a source of electrical energy for operating said motor; an accumulator for storing hydraulic fluid under pressure; a check valve connected between said accumulator and the discharge of fluid from said pump to prevent hydraulic pressure from being lost when said pump is not operating; a pressure switch connected to the discharge of said pump to break the electrical circuit between said source of electrical energy and said pump when the maximum operating pressure for hydraulic fluid has been reached; a relief valve connected to the discharge of said pump and adapted to discharge said fluid back to the suction of said pump at a hydraulic pressure greater than said electrical pressure switch is set for; a plurality of solenoid-operated, multiport valves hydraulically connected to said accumulator; a hydraulic cylinder connected to each of said solenoid-operated valves; a piston slidably mounted in each of said cylinders; a piston rod slidably mounted in the end portion of each of said cylinders and attached to said piston; a rotatably mounted member movably connected to the free end of each of said piston rods; a connecting rod movably connecting each of said rotatably mounted members with said platform; an inverter operated by said source of electrical energy; a gyroscope operated on electrical energy from said inverter and adapted to electrically signal any deviation of said platform from a predetermined plane; and a plurality of relays adapted to be actuated by said electrical signals from said gyroscope to establish an electrical circuit between said source of electrical energy and said valves whereby fluid is admitted to said cylinders to move the pistons contained therein and return said platform and camera boom to their predetermined plane.

EDWARD FURER.
CHARLES BRANDON LONON.

REFERENCES CITED

The following references are of record in the file of this patent:

UNITED STATES PATENTS

| Number | Name | Date |
|---|---|---|
| 366,438 | Tower | July 12, 1887 |
| 464,806 | Tower | Dec. 8, 1891 |
| 640,051 | Tower | Dec. 26, 1899 |
| 1,480,257 | Gerlinger | Jan. 8, 1924 |
| 2,005,530 | Boykow | June 18, 1935 |
| 2,047,922 | Seligmann | July 14, 1936 |
| 2,229,530 | South | Jan. 21, 1941 |
| 2,239,481 | Christensen | Apr. 22, 1941 |
| 2,368,628 | Bates | Feb. 6, 1945 |
| 2,381,160 | Hanna | Aug. 7, 1945 |
| 2,396,984 | Broadston et al. | Mar. 19, 1946 |